United States Patent [19]
Burdic et al.

[11] 3,739,380
[45] June 12, 1973

[54] SLANT RANGE TRACKING TERRAIN AVOIDANCE SYSTEM

[75] Inventors: William S. Burdic, Yorba Linda; Robert O. Case, Jr., La Habra, both of Calif.

[73] Assignee: North American Aviation, Inc.

[22] Filed: Apr. 4, 1960

[21] Appl. No.: 19,959

[52] U.S. Cl............... 343/7 TA, 343/7.3, 343/16 M
[51] Int. Cl............................ G01s 9/14, G01s 9/22
[58] Field of Search ....................... 343/7, 16.1, 12, 343/13, 16, 7.3, 7 TA, 16 M

[56] References Cited
UNITED STATES PATENTS

| | | | |
|---|---|---|---|
| 2,687,520 | 8/1954 | Fox | 343/16.1 |
| 2,809,340 | 8/1957 | Bernhart | 343/7 |
| 2,930,035 | 3/1960 | Altekruse | 343/7 |
| 2,948,892 | 8/1960 | White | 343/16.1 |
| 2,965,894 | 12/1960 | Sweeney | 343/7 |

*Primary Examiner*—Malcolm F. Hubler
*Attorney*—William R. Lane, L. Lee Humphries and Allan Rothenberg

EXEMPLARY CLAIM

11. In combination with an aircraft, a slant range tracking monopulse radar on said aircraft for producing a range signal proportional to slant range to ground along a boresight axis extending forward of said aircraft at a relatively small depression angle, said radar including an antenna defining said boresight axis, means for sensing angle of attack of said aircraft, means responsive to said sensing means for stabilizing said antenna relative to the flight path of said aircraft, means for generating a reference signal proportional to nominal slant range to a point at a predetermined distance below said flight path, first comparator means responsive to said range and reference signals for producing a first control signal proportional to the difference therebetween, a vertically directed altimeter producing a measured elevation signal, means for generating a second reference signal proportional to a nominal elevation, second comparator means responsive to said elevation and second reference signals for producing a second control signal proportional to the difference therebetween, an aircraft elevation control divice, switch means for alternatively coupling said first or second control signals to said control device, a peak rectifier providing a first signal path between said first comparator means and said switch means, a delay device providing a second signal path between said first comparator means and said switch means, said radar including means for generating a range gate, on-target means for detecting coincidence of said gate and a signal received by said radar, and means responsive to said on-target means for operating said switch means to couple said first control signal to said control device when said coincidence is detected and to couple said second control signal to said control device when said coincidence is absent.

13 Claims, 6 Drawing Figures

Patented June 12, 1973
3,739,380
3 Sheets-Sheet 1
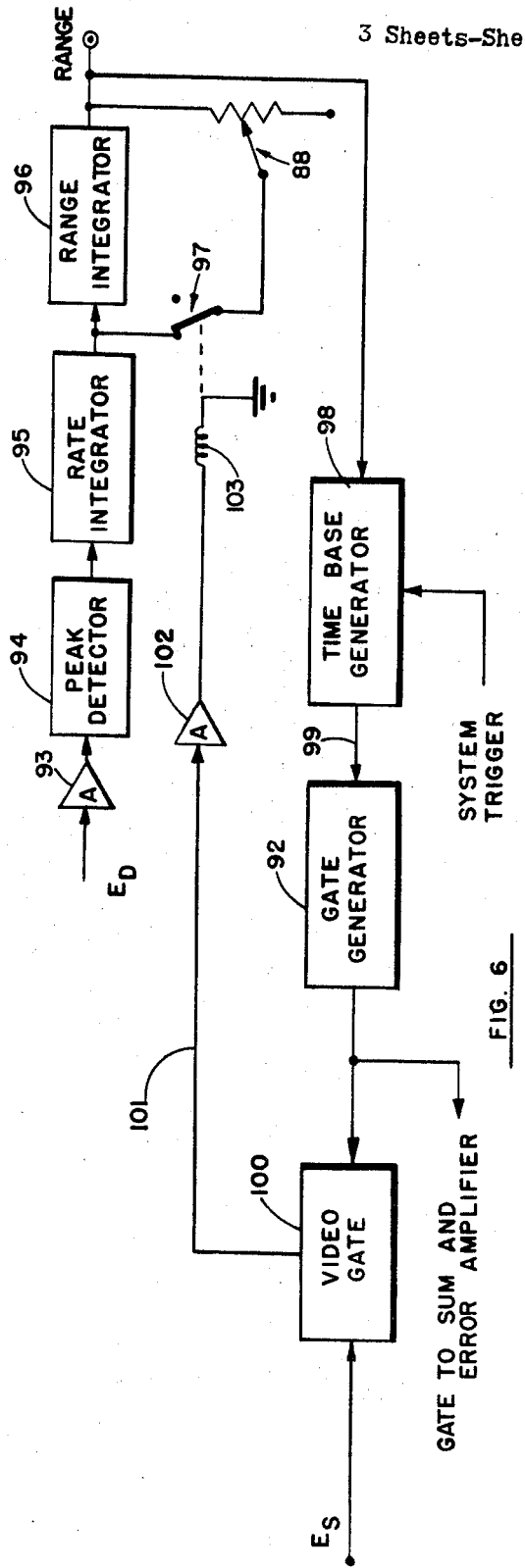
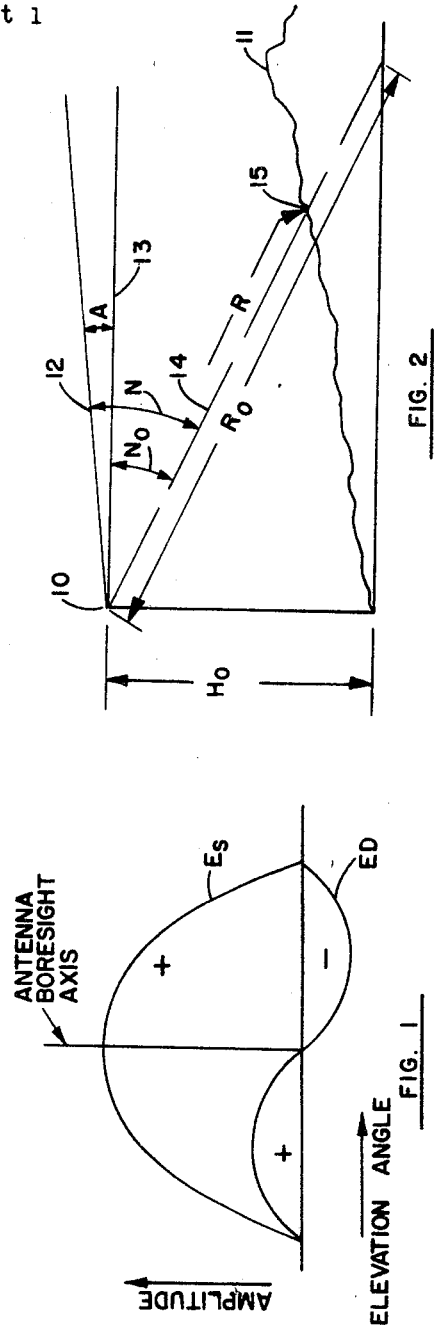
INVENTORS
WILLIAM S. BURDIC
ROBERT O. CASE JR.
BY Allan Rothenberg
ATTORNEY INVENTORS
WILLIAM S. BURDIC
ROBERT O. CASE JR.
BY Allen Rothenberg
ATTORNEY INVENTORS
WILLIAM S. BURDIC
ROBERT O. CASE JR.
BY
Allan Rothenberg
ATTORNEY

SLANT RANGE TRACKING TERRAIN AVOIDANCE SYSTEM

This invention relates to terrain avoidance systems, and particularly concerns the use of a slant range tracking radar for automatic elevation guidance of low flying aircraft.

In certain applications of piloted and unpiloted aircraft, it is desired to fly at moderate to high speeds at a relatively low height above the ground. This type of operation is inherently dangerous because of possible collision with elevated terrain features. For this reason, some type of automatic or semi-automatic control system is required in order to maintain a safe terrain clearance.

Barometric altimeters have been used with an autopilot in order to maintain constant altitude. This arrangement has the disadvantage of failing to give indication of the existence of terrain features which may extend above the selected altitude. Furthermore, the altitude indicated by a barometric altimeter may vary by hundreds of feet with changing location and meteorological conditions.

An absolute altimeter (radar, optical, or sonic) has been used in conjunction with an autopilot in order to maintain a constant height above the terrain. This system has the disadvantage that there is no warning of impending obstacles. Further, a steep gradient of the ground below the aircraft may result in a situation where the ground elevation change is greater than the elevation change which can be achieved by the aircraft within the time available.

An effective solution of the problem is described in an application Ser. No. 830,675, of W. E. Stoney, for Terrain Clearance Radar, wherein a forward looking monopulse radar is utilized to provide a pilot's display of all dangerous terrain obstacles within the radar beam. Such a system requires precision circuits and complex equipment but produces no proportional control signal.

Forward looking radio altimeters in conjunction with vertically directed absolute altimeters have been utilized as described in a U. S. Pat. to Hunter, No. 2,225,046, and a U. S. Pat. to Ward, No. 2,574,853. The difficulty with a forward looking altimeter such as that of Ward or Hunter is that it measures the range to the nearest element of the terrain within the relatively wide radar beam. There is no assurance that the range measured thereby is truly the range along the antenna boresight axis. Since the beam of a practical antenna necessarily has a considerable angular extent in the elevation plane, there is the possibility or even probability that terrain elements along the ground which give a strong radar return will cause a response of the altimeter even though such elements are at considerable shorter range than the range to the ground along the boresight axis. This is particularly true where very low altitude flight is attempted and, therefore, where the depression angle of the antenna is quite small. Under such circumstances, the measured slant range distance might well be in error by a factor of two or more.

Accordingly, it is an object of this invention to provide a relatively simple and accurate terrain avoidance system which gives ample warning of an impending obstacle and institutes corrective action before the obstacle is reached.

In carrying out the principles of the invention according to a preferred embodiment thereof, there is provided a monopulse radar having an antenna with its boresight axis stabilized to a fixed depression angle relative to a selected direction such as a horizontal line or flight path of the aircraft. A slant range tracking computer is provided to track the range along the antenna boresight axis whereby such range is accurately measured. The system uses on-axis information only, under equilibrium conditions. The measured slant range is compared with a nominal range to generate a control signal which indicates the elevation of ground at the boresight axis relative to a nominal point at a preselected distance below the flight path or horizontal reference direction. The nominal range is so adjusted as to give the desired clearance under steady state conditions. If the ground along the heading of the aircraft slopes upwardly, the measured slant range will decrease to produce a control signal causing the aircraft to pitch upwardly. The converse will occur for a negative ground gradient whereby the aircraft will tend to follow the ground contour. Typically, the nominal range will be about 2 miles and the antenna depression angle about 3°, resulting in a nominal terrain clearance of 550 feet. One may consider the aircraft utilizing the system of this invention as flying a course such that an angle of 3°, for example, is maintained between it and an imaginary rod 2 miles long which touches the ground ahead of the aircraft.

Since slant range tracking may be lost when traveling over a smooth surface which gives little scattering of radio frequency energy, the aircraft may be left without vertical guidance. The described embodiment of the present invention incorporates a radio altimeter which is utilized alternatively to the slant range tracking radar and switched into the system to control the aircraft when loss of radar return signal is detected.

It is an object of this invention to provide an improved terrain avoidance system.

A further object of this invention is to provide a terrain avoidance system which produces precisely measured information without requiring critical circuit precision or antenna error pattern linearity.

Another object of the invention is to provide a terrain avoidance system utilizing only on-axis information.

Still another object is the provision of a terrain avoidance system combining the advantages of slant range tracking radar, together with the advantages of an absolute altimeter.

These and other objects of the invention will become apparent from the following description taken in connection with the accompanying drawings in which FIG. 1 illustrates the phase relations which exist in the sum and error channels of the monpulse elevation radar utilized in the described embodiment of this invention;

FIG. 2 illustrates the geometry of the problem solved by the system of this invention;

FIG. 3 comprises a functional diagram of the invention;

Figure 3:
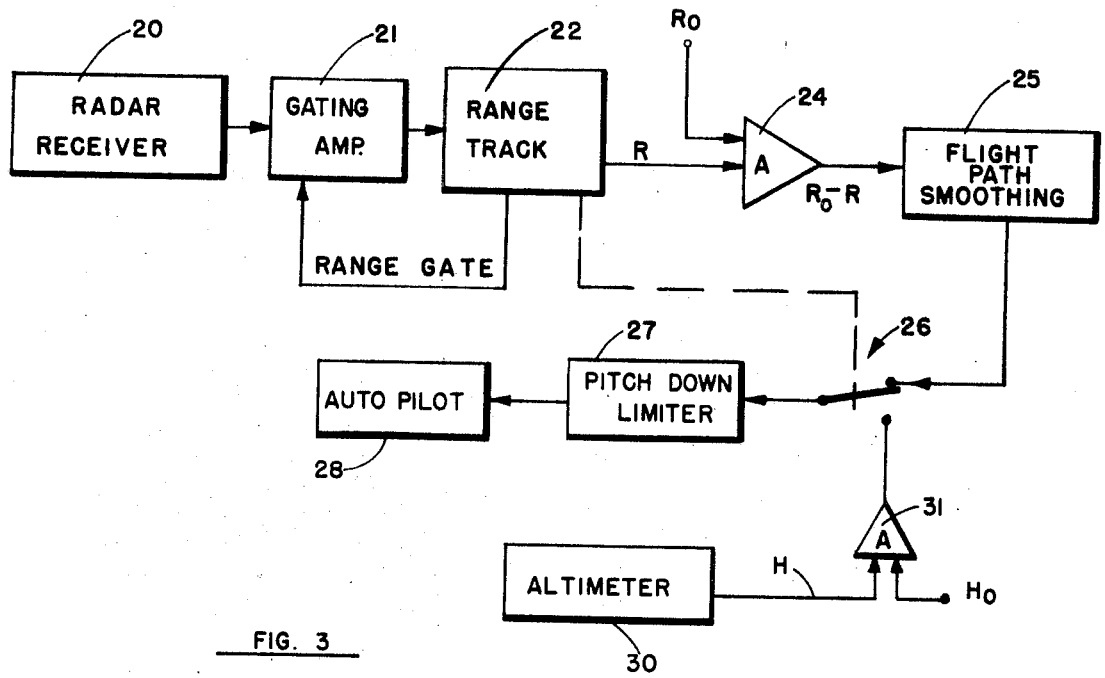

And FIG. 6 illustrates certain details of the range tracking unit of the system.

In the drawings, like reference characters refer to like parts.

A monopulse radar produces a multilobe radiation pattern and employs a pair of receiver channels for sum and error signals respectively representing additively and subtractively combined radar reflections. The typical monopulse radar system has a pair of such channels for azimuth information and a similar pair for elevation information. However, only those receiver channels concerned with elevation information are of significance in the present invention. As illustrated in FIG. 1, the phase of the sum channel signal $E_S$ may be used as a phase reference. This reference phase may be termed positive. The sum channel signal is substantially symmetrical about the boresight axis and has a maximum thereat. The error (or difference) channel signal $E_D$ is in phase with the sum signal $E_S$ on one side of the boresight axis and out of phase with the sum signal on the other side of the boresight axis (for certain types of monopulse). Further, the difference channel signal $E_D$ exhibits a null amplitude for targets lying upon or along the boresight axis Thus, it will be seen that the error signal $E_D$ has a crossover point which precisely indicates the antenna boresight axis. The slant range tracking computer tracks this crossover point or null amplitude and provides a range signal proportional to the range along the boresight axis. The linearity of the antenna radiation pattern is of relatively little significance since it is the crossover point of the error signal $E_D$ which is utilized to provide the slant range information.

As illustrated in FIG. 2, an aircraft at point 10 is flying relatively close to the ground indicated at 11 with the longitudinal (roll) axis of the aircarft extending along line 12. The aircraft flies with an angle of attack A such that is velocity vector is indicated by line 13. It is desired to fly the aircraft in elevation such that a distance $H_O$ measured substantially normal to the flight path 13 is maintained between the flight path and the ground. The boresight axis of the antenna is directed along the line 14 such that is intersects the ground 11 at point 15 having a slant range R. The boresight axis of the antenna is depressed relative to the aircraft through a depression angle N equal to the sum of a nominal depression angle $N_0$ and A. The antenna axis is stabilized in elevation at the angle $N = N_0 + A$. Under these conditions the slant range to crossover (that is, on the boresight axis) is the nominal range $R_0$ whereby $R_0 = H_0$ cosecant $N_0$.

The difference between $R_0$ and the actual slant range R to ground is utilized as the input to the autopilot or elevation control mechanism of the aircraft to control the aircraft in elevation. If the measured range R is less than the nominal range $R_0$, the terrain has a rising slope as illustrated in FIG. 2 and a pitch-up control signal is provided to the autopilot. When R is greater than $R_0$ the terrain has a negative gradient and a pitch-down order is provided to the autopilot.

As illustrated in FIG. 3, the sum and error signals of the radar receiver 20 are fed through gating amplifiers 21 which are preferably one or more of the amplifiers of the receiver itself. A range tracking computer 22 receives the error signal $E_D$ and provides as one of its outputs a measured range signal R precisely proportional to the slant range to ground along the boresight axis. The error signal crossover point is tracked within the range computer to produce a range gate positioned at the crossover point; that is, the range gate is arranged to occur at the time when the received error signal $E_D$ changes phase. The range gate gates the amplifiers 21 so that the signal passed through to the range tracking computer 22 occurs solely in coincidence with the existence of the range gate whereby a closed range tracking loop is provided. The range signal R is fed to a summing amplifier 24, together with a nominal range signal $R_0$ to produce a control signal proportional to the difference $R_0 - R$. The control signal is fed through a smoothing circuit 25 which provides a certain amount of smoothing for the flight path. This is desirable in order to prevent excessive fuel requirement of an irregular flight path and may also provide an increased response to a pitch-up or warning signal as compared with a pitch-down signal.

The smoothed control signal is fed through a switch 26 and through a pitch-down limiter 27 to the autopilot 28. The pitch-down limiter 27 limits the negative pitch signal to the autopilot to a predetermined value so as to prevent the flight path from exceeding a pitch-down angle of 3°, for example.

There is some danger that a prolonged negative terrain gradient would result in the aircraft flying into the ground. The reason for this is that an aircraft flying 500 feet above the ground at the radar axis intersection may possibly be at or (theoretically) below the ground which is directly under the aircraft. For this reason the pitch down limiter is provided. It will be readily appreciated, however, that under certain circumstances and certain known paths of travel, the limiter 27 may be eliminated and the signal fed directly to switch 26 to the autopilot.

One difficulty that may be encountered in the use of the above system is the possibility of losing lock-on or range tracking when traversing an expanse of water, ice, or other surface which gives little scattering of radio frequency energy. Such an event would leave the aircraft without vertical guidance. For this reason there is provided a vertically-directed radio altimeter 30 which produces a signal H proportional to the vertical distance between the aircraft and the ground directly under it. A reference altitude signal $H_0$ is provided from which is subtracted the measured altitude H in a summing amplifier 31 to provide a second control signal ($H_0 - H$) to the autopilot via the switch 26.

The range tracking unit 22 is arranged to provide an on-target signal which indicates the existence of a predetermined minimum level of radar return in coincidence with the occurrence of the range gate. When this coincidence signal exists, the on-target signal operates the switch 26 to the illustrated position thereof wherein the signal $R_0 - R$ is supplied to the autopilot. In the event of loss of radar signals or loss of lock-on, vertical guidance is transferred to the altimeter since the switch 26 is then operated to couple the amplifier 31 to the autopilot.

Since the loss of radar signal implies a fairly flat ground surface, it is safe to allow the altimeter to maintain a given clearance. The range gate is provided with a quiescent position corresponding to $R_0$. Since the altimeter holds the altitude to very nearly its correct value, the error signal crossover will occur at a value substantially equal to $R_0$ when the error signal reappears. When the error signal reappears, the switch 26 is actuated to couple the signal from amplifier 24 to the autopilot.

Figure 4:
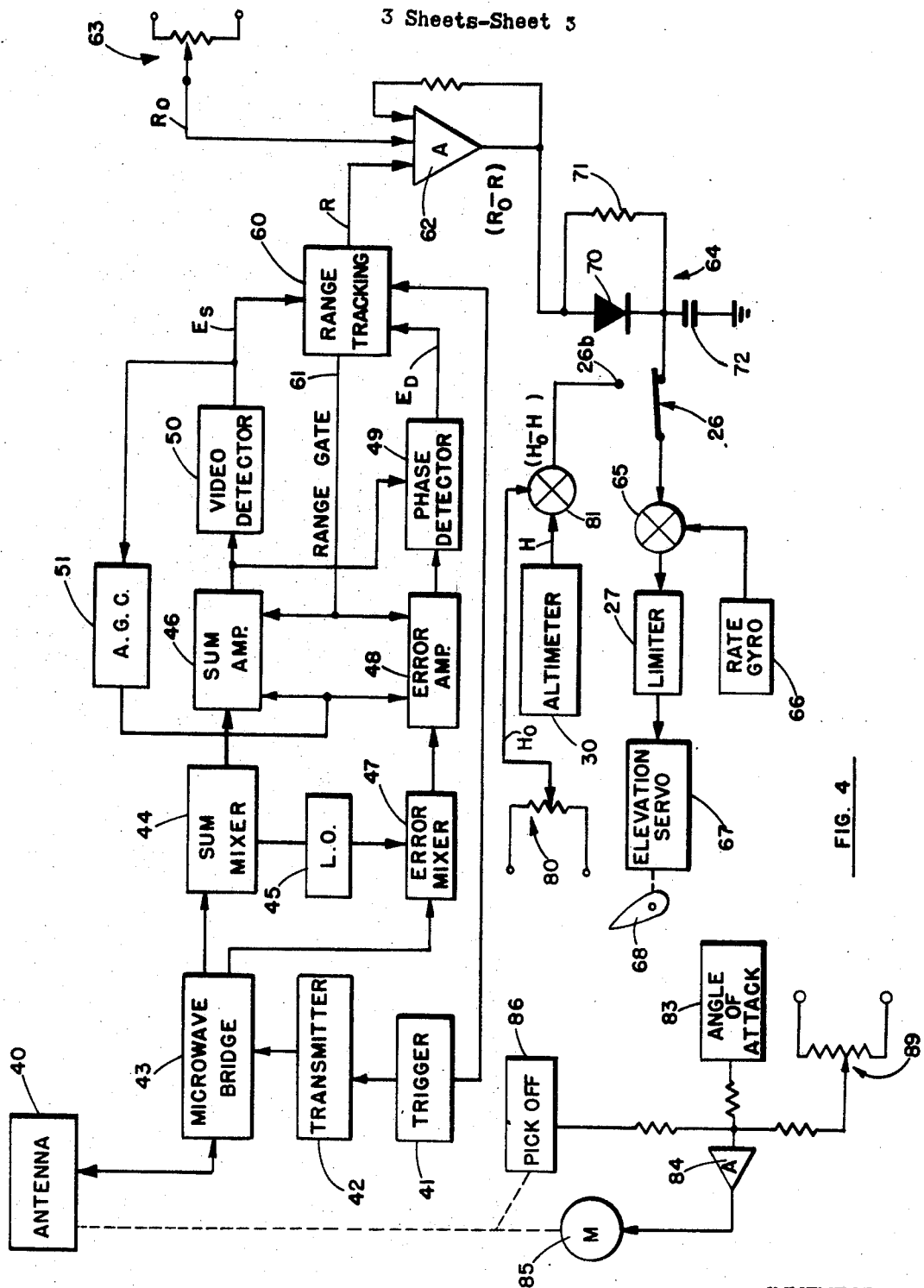
FIG. 4 is a block diagram of a preferred embodiment of the invention.

As illustrated in FIG. 4, the radar system includes an antenna 40 which may be of the conventional paraboloid type such as that employed in the monopulse system described in the copending application of R. M. Ashby, Ser. No. 216,145, filed Mar. 17, 1951. Synchronized from a system trigger 41, a transmitter 42 generates pulses of energy in a suitable frequency band such as, for example, between 8,600 and 9,600 megacycles per second although other frequencies obviously may be used. The transmitter pulses may be fed to the antenna through microwave bridges 43 which also receive the pulse echoes from the antenna for transmission to the sum and error channels of the monopulse receiver which may be of the type described in the aforementioned application of R. M. Ashby or in the aforementioned application of W. E. Stoney. Other monopulse radars which may be used in the practice of the described invention are described in U. S. Pat. No. 2,682,566 to Phillips and U. S. Pat. No. 2,817,835 to Worthington, Jr.

The receiver sum channel comprises a sum mixer 44 having a first input from a local oscillator 45 and a second input from the antenna 40 via the microwave bridge 43 in the form of additively combined energy (pulse echoes) from the two lobes of the elevation radiation pattern of the antenna. The output of sum channel mixer 44 is fed to the intermediate frequency amplifiers of the sum channel comprising one or more sum channel amplifiers 46.

The elevation error channel of the receiver comprises an error channel mixer 47 having a first input from the local oscillator 45 and a second input from the antenna 40 via the microwave bridge in the form of subtractively combined pulse echoes received by the two elevation antenna lobes. The output of the difference or error mixer 47, is fed to intermediate frequency error channel amplifiers 48 and thence to a conventional phase detector 49 which is phase referenced from the sum channel signal $E_s$ provided at the output of the intermediate frequency amplifiers 46 thereof. The output of the phase detector 49 comprises the elevation signal $E_D$ which has a polarity relative to the sum signal as illustrated in FIG. 1 and has a zero crossover point indicative of slant range to a reflecting target on the antenna boresight axis.

The output of the intermediate frequency sum channel amplifier 46 is detected in video detector 50 to provide the sum signal $E_S$ which is fed back to automatic gain control circuitry 51 which in turn controls the gain of both the sum and error channel amplifiers.

It will be readily appreciated that the monopulse circuits are non-critical since the range tracking loop is closed around them. Thus, careful matching of cyrstals is avoided. Only rough gain tracking in the receivers is required, and antenna error pattern linearity is not demanded.

The error signal $E_D$ from detector 49 is applied to the range tracking unit 60, more particularly described in connection with FIG. 6. The range tracking unit positions a range gate at the ground crossover (the antenna boresight axis), provides this range gate via lead 61 to the receiver amplifiers and provides a range voltage R to a comparator amplifier 62.

The range gate is positioned in accordance with the range signal R. The range signal R is a voltage proportional to the time interval between the system trigger and the instant of zero crossover of the error signal $E_D$. Thus, the range track unit has an input from the system trigger unit 41.

In order to detect loss of radar return signal, the range tracking unit 60 also has an input in the form of the sum signal $E_S$ from video detector 50, as will be later described.

An adjustable potentiometer 63 is provided for producing the nominal range signal $R_O$ proportional to the nominal slant range as illustrated in connection with FIG. 2. In the comparator amplifier 62, the positive range voltage R is mixed with negative voltage proportional to $R_O$ and the difference inverted to provide an error signal $R_O - R$. The amplified error control signal $R_O - R$ is fed through flight path smoothing network 64 and through switch 26 to the elevation control mechanism of the aircraft. The output of the switch 26 is summed in a comparator 65 with an elevation rate signal produced by a rate gyro 66 for purposes of rate stabilization. The output of comparator 65 is fed to an elevation servo 67 which controls the position of the aircraft elevators 68. If deemed necessary or desirable, the pitchdown limiter 27, as previously described, may be interposed between the comparator 65 and elevation control mechanism.

The flight path smoothing circuit 64 comprises a peak rectifier with a calibrated delay. The rectifier is illustrated as comprising a series connected diode 70 while the delay is provided by a resistor 71 connected across the diode together with a capacitor 72 connected between the diode and ground as illustrated. A positive control signal (where $R_o$ is greater than R) causes the diode 70 to conduct, quickly charging the capacitor 72 and demanding a rapid autopilot response. A down signal, on the other hand, is of a negative polarity and is not passed by the diode 70 but is subjected to the time constant of the resistance capacitance circuit 71,72 which may be, for example, on the order of 10 seconds, whereby the aircraft will respond more slowly to a down signal than an up signal. The comparator amplifier 62 is provided with a gain such that the output thereof represents the commanded altitude change with a positive voltage representing a pitch-up signal and a negative voltage representing a pitch-down signal.

Figure 5:
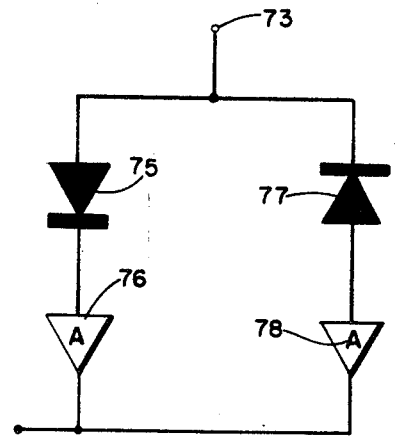
FIG. 5 illustrates an alternative arrangement for effecting smoothing of the flight path.

An alternative flight path smoothing circuit is illustrated in FIG. 5. It operates to provide different gains for positive and negative pitch command signals. The circuit of FIG. 5 has an input terminal 73 for connection with the output of amplifier comparator 62 and an output terminal 74 for connection with the switch 26. The circuit provides a first path for a positive pitch control signal comprising a diode 75 and an amplifier 76 of relatively high gain. The circuit also provides a path for negative or pitch-down signal comprising an oppositely-poled diode 77 and an amplifier 78 having a gain less than that of amplifier 76.

As illustrated in FIG. 4, altimeter control utilized upon loss of radar signal comprises a conventional radio altimeter 30, vertically directed so as to produce a measured altitude signal H, and a manually adjustable potentiometer 80, energized from a source (not shown) which produces a nominal altitude signal $H_O$. The signals H and $H_O$ are subtracted in a comparator 81 to produce an elevation control signal proportional to the difference $H_O - H$ which is fed to a second terminal 26$b$ of the switch 26.

Preferably, the antenna 40 is mounted for pivotal motion in elevation and is stabilized to a fixed depression angle $N_o$ with respect to flight path. For this purpose there is provided angle of attack meter 83 driving, via amplifier 84, an elevation servo motor 85 which is connected to position the antenna in accordance with the sum of the output of the angle of attack meter 83 and a voltage from a manually adjustable potentiometer 89 representing the desired fixed depression angle $N_O$. A closed loop antenna elevation control is provided by pickoff 86 which senses the antenna elevation position and feeds a position signal to the input of servo motor amplifier 84 in accordance with well-known techniques. Thus, if the angle of attack varies, the depression angle of the antenna with respect to the airframe will be changed by an equal and opposite amount whereby the boresight axis is stabilized relative to the flight path.

When using flight path stabilization, all heights will be measured relative to the flight path. Therefore, if an aircraft is approaching a steep hill of say 2,000 feet in height with a desired clearance of, for example, 500 feet, it is not necessary to immediately cause the aircraft to rise to an altitude of 2,500 feet; rather, the aircraft is controlled to a condition such that its inclined flight path will pass above the top of such hill by 500 feet. During the approach to such a hill, the aircraft will be enabled to stay closer to the terrain immediately below. Furthermore, the control system is inherently more stable because of the fact that the control signal will disappear as soon as the aircraft has pitched up to the proper angle thus obviating a much more violent maneuver which would otherwise be required if it were necessary to bring the aircraft immediately to an elevation sufficient to clear the terrain ahead of the aircraft.

Illustrated in FIG. 6 are certain details of the range tracking computer 60. The illustrated computer is of the type more particularly described in the copending application of G. J. Himler and O. C. Mitchell for "Range Tracking Computer System," Ser. No. 703,796, filed Dec. 19, 1957. For terrain clearance or slant range ground tracking the error channel signal $E_D$ from phase detector 49 (FIG. 4) is fed to an error amplifier 93 which in turn feeds a peak detector 94.

The peak detector 94 provides an output which, in magnitude and polarity, is indicative in magnitude and sense, of the angular distance from the boresight axis of the ground within the range gate. It is, therefore, indicative of the sense of the error between the indicated range and the actual range along the boresight axis to the ground. For example, if the indicated range is less than the actual range, the range gate will occur short of the intersection of the boresight axis and the ground; the ground within the range gate in this case will produce an error signal $E_D$ whose polarity is indicative of a negative elevation angle. Conversely, if indicated range is greater than actual range, $E_D$ will indicate a positive elevation angle. If the indicated range is exactly right, $E_D$ will be zero.

The output of peak detector 94 is applied to a rate integrator 95 and thence to a range integrator 96. A loop is closed from the output to the input of range integrator 96 through an adjustable potentiometer 88 which has the arm thereof set to provide a voltage such that the range output R of the range integrator 96 will be equal to the nominal slant range $R_O$ when the loop is closed. The loop around the range integrator 96, in the absence of lock-on or when radar signal is lost, is closed by means of a switch 97 which is then actuated to the illustrated position thereof. When the loop is opened by operation of switch 97, the output of the range integrator 96 is proportional to the tracked slant range along the boresight axis.

The range output of the integrator 96 is fed to a time base generator 98 also receiving an input from the system trigger 41 to produce a pulse on lead 99 which occurs (under equilibrium conditions) at the crossover point of the error signal $E_D$. The output of the time base generator is fed to gate generator 92 which produces a range gate at the error signal crossover point. This range gate is fed to the sum and error receiver channels as illustrated in FIG. 4 whereby these channels will pass the sum and error signals solely upon occurrence of the range gate. Thus, a closed range tracking loop is provided, the range gate moving in or out in time until the error signal $E_D$ is nulled.

There is also provided a video gater 100 which may comprise a pentode circuit operated as a coincidence gate as particularly described in the aforesaid Himler and Mitchell application. The gater 100 provides an output signal on lead 101 when the range gating signal occurs in coincidence with a radar return as provided from the sum channel in the form of the signal $E_S$. Thus, in the absence of coincidence of $E_S$ and the range gate, or if the signal $E_S$ is below a predetermined threshold level, no output from the gater is provided.

The coincidence or on-target output on lead 101 of video gater 100 is utilized to cut off a normally conducting on-target amplifier 102. Amplifier 102, when conducting, energizes a coil 103 of an on-target relay. The on-target relay includes contacts 97, illustrated in FIG. 6, and also includes the contacts of switch 26 (FIG. 4). Thus, when the on-target amplifier 102 conducts (in the absence of lock-on) on-target relay coil 103 is energized to move the arm of switch 26 into contact with terminal 26b and thereby provide elevation control by means of the altimeter 30. Energization of coil 103 also holds the contacts of switch 97 in the position, as illustrated, to provide the quiescent range voltage output of integrator 96 equal to the nominal range, $R_O$. When lock-on is achieved, a signal is provided on lead 101 to cut off the ontarget amplifier 102 thereby de-energizing coil 103 and releasing switches 26 and 97. In such a situation, switch 26 is actuated to the position illustrated in FIG. 4 to couple the slant range comparator amplifier 62 to the autopilot. At the same time, switch 97 is actuated to break the loop closed around range integrator 96 whereby the output of the latter is proportional to R, the slant range along the boresight axis. This signal R is fed to the comparator amplifier 62 as described in connection with FIG. 4.

It is to be understood that FIG. 6 illustrates solely those portions of the range tracking unit which are required for the practice of the present invention. For complete description of this computer, reference is made to the aforesaid copending application of Himler and Mitchell.

It will be seen that there has been described a relatively simple, yet highly precise, system which accurately measures the rise in terrain well ahead of the flight path of an aircraft and enables the desired clearance to be maintained subject only to the ability of the aircraft control system to follow command signals. The described invention provides a truly proportional control signal for autopilot control, achieves optimum stabilization of the system relative to the flight path, provides for flight path smoothing, and is furthermore arranged to continue to operate upon the loss of radar signals.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a vehicle borne automatic terrain avoidance system, monopulse radar means for providing a monopulse error signal having a null amplitude occurring for a target on boresight, gating means for selectively passing said error signal, a gate generator for controlling said gating means, means responsive to the output of said gating means for operating said gate generator in response to said null amplitude of said error signal for generating a target range signal, means for comparing said target range signal with a reference signal to produce a terrain avoidance control signal, a vehicle elevation control device for said vehicle, and means responsive to said comparing means for operating said elevation control device.

2. The system of claim 1, including flight path smoothing means for causing said control device to respond differently to said control signal according to the sense of the elevation change commanded thereby.

3. The system of claim 1, including flight path smoothing means interposed between said comparing means and said control device, said smoothing means comprising a first circuit responsive to a first control signal polarity and a second circuit responsive to a second control signal polarity, each said circuit coupling said comparing means with said control device.

4. The system of claim 3 wherein said first and second circuits have different response times.

5. The system of claim 3 wherein said first and second circuits have different gains.

6. In an automatic terrain avoidance system, an aircraft, monopulse radar means on said aircraft for providing a monopulse error signal having a null amplitude occurring for a target on boresight, gating means for selectively passing said error signal, a gate generator for controlling said gating means, means responsive to the output of said gating means for triggering said gate generator during said null amplitude of said error signal, means responsive to said gated error signal for generating a signal indicative of target range, means for comparing said target range signal with a reference signal to produce a terrain avoidance control signal, and control means responsive to said comparing means for maintaining said aircraft at a selected altitude above the ground a point substantially ahead of said aircraft.

7. The system of claim 6 including an altimeter for generating a measured altitude signal, a reference altitude signal generator, comparator means for producing a second control signal having a known relation to the difference between said measured and reference altitude signals, a switch for alternatively feeding said first-mentioned control signal or said second control signal to said control means, on-target means for detecting loss of radar signal, and means responsive to said on-target means for actuating said switch.

8. In an automatic terrain avoidance system, monopulse radar means for providing a monopulse error signal having a null amplitude which occurs for a target on boresight, gating means for selectively passing said error signal, a gate generator for controlling said gating means, means responsive to the output of said gating means for operating said gate generator during said null amplitude of said error signal, means responsive to the gated error signal for generating a range signal, means for comparing said range signal with a reference signal to produce a first terrain avoidance control signal, altimeter means for producing a second terrain avoidance control signal, on-target means for sensing loss of radar signal, and means responsive to said on-target means for selecting one of said control signals.

9. An aircraft, monopulse radar means on said aircraft for providing an error signal having a null amplitude which occurs for a target on axis, means for generating a range signal delineating the range of said on-axis target, means for generating a reference signal delineating a predetermined slant range, comparator means for providing an output signal having a sense corresponding to the sense of the difference between said range and reference signals, an elevation flight control device for said aircraft, means responsively connecting said device to the output of said comparator means so as to cause said aircraft to change elevation more rapidly when said output signal has one sense than when said output signal has another sense, and altimeter means for operating said elevation flight control device in the event of loss of signal from said radar means.

10. In combination with an aircraft, a slant range tracking monopulse radar on said aircraft for producing a range signal providing a measure of slant range to ground along a boresight axis extending forward of said aircraft at a relatively small depression angle, said radar including an antenna defining said boresight axis, means for sensing angle of attack of said aircraft, means responsive to said sensing means for stabilizing said antenna relative to the flight path of said aircraft, means for generating a reference signal expressive of nominal slant range to a point at a predetermined distance below said flight path, comparator means for determining the difference between said range and reference signals to produce a first control signal, a vertically directed altimeter producing a measured elevation signal, means for generating a second reference signal expressive of a nominal elevation, second comparator means for determining the difference between said elevation and second reference signals to produce a second control signal, an aircraft elevation control device, switch means for alternatively coupling said first or second control signals to said control device, said radar including means for generating a range gate and on-target means for detecting coincidence of said gate and a signal received by said radar, and means responsive to said on-target means for operating said switch means to couple said first control signal to said control device when said coincidence is detected and to couple said second control signal to said control device when said coincidence is absent.

11. In combination with an aircraft, a slant range tracking monopulse radar on said aircraft for producing a range signal proportional to slant range to ground along a boresight axis extending forward of said aircraft at a relatively small depression angle, said radar including an antenna defining said boresight axis, means for sensing angle of attack of said aircraft, means responsive to said sensing means for stabilizing said antenna relative to the flight path of said aircraft, means for generating a reference signal proportional to nominal slant range to a point at a predetermined distance below said flight path, first comparator means responsive to said range and reference signals for producing a first control signal proportional to the difference therebetween, a vertically directed altimeter producing a measured elevation signal, means for generating a second reference signal proportional to a nominal elevation, second comparator means responsive to said elevation and second reference signals for producing a second control signal proportional to the difference therebetween, an aircraft elevation control device, switch means for alternatively coupling said first or second control signals to said control device, a peak rectifier providing a first signal path between said first comparator means and said switch means, a delay device providing a second signal path between said first comparator means and said switch means, said radar including means for generating a range gate, on-target means for detecting coincidence of said gate and a signal received by said radar, and means responsive to said on-target means for operating said switch means to couple said first control signal to said control device when said coincidence is detected and to couple said second control signal to said control device when said coincidence is absent.

12. A vehicle borne monopulse radar including an antenna having a multilobe radiation pattern directed towards points on the ground along a boresight displaced by a relatively small angle from a selected reference direction, a pair of receiver channels for sum and error signals respectively representing additively and subtractively combined radar reflections; a range track unit comprising means responsive to said error signal for producing a range signal proportional to slant range to ground on said boresight, a range gate generator responsive to said range signal for producing a gating signal, a video gater responsive to said sum and gating signals for producing an on-target signal when coincidence of said sum and gating signals occurs; means responsive to said gating signal for gating said receiver channels; means for generating a range reference signal and means for subtracting said range signal therefrom to produce a first control signal; a vertical altimeter for producing a measured altitude signal, means for generating an altitude reference signal and means for subtracting said measured altitude signal therefrom to produce a second control signal; a vehicle elevation control mechanism, switch means for alternatively coupling said first or second control signals to said mechanism; and means responsive to said video gater for operating said switch to couple said first control signal to said mechanism when said on-target signal is produced.

13. In a vehicle borne automatic terrain avoidance system, monopulse radar means including slant range tracking means for providing a measure of range to the ground along a depressed line, means for comparing said measured range with a reference to produce a terrain avoidance control signal, a vehicle elevation control device, and means responsive to said comparing means for operating said elevation control device.

* * * * *